United States Patent [19]

Hayden

[11] 3,944,893
[45] Mar. 16, 1976

[54] VEHICLE WINDOW HEATER CONTROL DEVICE

[75] Inventor: Rodney Hayden, Stoney Creek, Canada

[73] Assignee: TRW Inc., Cleveland, Ohio

[22] Filed: Oct. 29, 1974

[21] Appl. No.: 518,532

[30] Foreign Application Priority Data
Oct. 29, 1973 Canada .................................. 184419

[52] U.S. Cl. ............ 317/148.5 R; 219/203; 219/492
[51] Int. Cl.² ...................................... H02H 47/32
[58] Field of Search ........... 219/203, 482, 484, 490, 219/492, 493, 501, 506, 522; 322/17, 18, 37, 80, 83; 317/123, 148.5 R, 148.5 B

[56] References Cited
UNITED STATES PATENTS

| | | | |
|---|---|---|---|
| 3,624,354 | 11/1971 | Heidorn | 219/203 |
| 3,790,745 | 2/1974 | Levin | 219/203 |
| 3,858,027 | 12/1974 | Phillips | 219/522 |

*Primary Examiner*—J. D. Miller
*Assistant Examiner*—Harry E. Moose, Jr.
*Attorney, Agent, or Firm*—James R. O'Connor

[57] ABSTRACT

The specification discloses a control device for an automotive window heater energized by an alternator having a field winding and comprising a manual switch terminal, an ignition terminal, a battery terminal, indicator terminal, field winding terminal and a ground terminal; a first normally open relay having a winding and a first normally open armature switch; a triggerable switch device electrically in series with said first relay winding between said ignition terminal and ground; a trigger circuit for said triggerable switch electrically disposed between ground and said manual switch terminal; a timing circuit including a chargeable condenser; a second relay having a winding and a second normally open armature switch; and a voltage responsive switch responsive to a voltage greater than a predetermined value and electrically in series with said winding of said second relay between ground and said indicator terminal; said first and second relay switches when closed connecting said indicator terminal respectively to said battery terminal and said field winding terminal.

3 Claims, 2 Drawing Figures

VEHICLE WINDOW HEATER CONTROL DEVICE

BACKGROUND OF THE INVENTION

This invention relates to a two stage timer control for an automobile window heater electrical power source of the alternator type having a field winding, the control when activated by the operator causing the heater to be energized at full alternator voltage for a predetermined period of time and thereafter at reduced voltage until deactivated by the operator or until the ignition is turned off.

A heating element employed for deicing a rear and front window of an automobile is actuable by a manual switch to cause the same to be operative at a heating level which is limited by a number of conditions. The generation of heat at too rapid a rate will, after the initial melting of ice and evaporation of moisture, cause the glass of the windows to achieve a temperature too high to be safe against temperature shock by sudden cooling. Thus, while it is desirable to have a high rate of heating for a certain period of time to melt ice or snow on the glass window surfaces, it is undesirable to maintain a temperature in the glass higher than that necessary to melt fresh snow falling onto the glass surface after the removal of ice therefrom. Thus two rates of heating are required for an ideal control and operation of window heaters.

It is an object of the invention to provide a direct current timer control device for a window heater of an automobile.

It is another object of the invention to provide a direct current timer especially adapted for use with a window heater energized by an independent alternator driven by the engine of the automobile.

It is another object of the invention to provide a control device for an automobile window heater in which the heater is energized to full alternator voltage for a predetermined period of time upon manual actuation of a heater switch and thereafter without further actuation of said switch said heater is operated at substantially lesser voltage from said alternator.

It is a still further object of the invention to provide a control device for a window heater of the separate alternator driven type having six terminals for connection in automobile circuitry, the latter having an ON-OFF window heater switch, an indicator lamp, an alternator field winding and a resistor normally connected in series with said field winding and a time circuit in said control adapted to shunt said resistance for a predetermined period of time.

Other objects of the invention will be appreciated in more detail by reference to the accompanying drawings.

DESCRIPTION OF A PREFERRED EMBODIMENT

Figure 2:
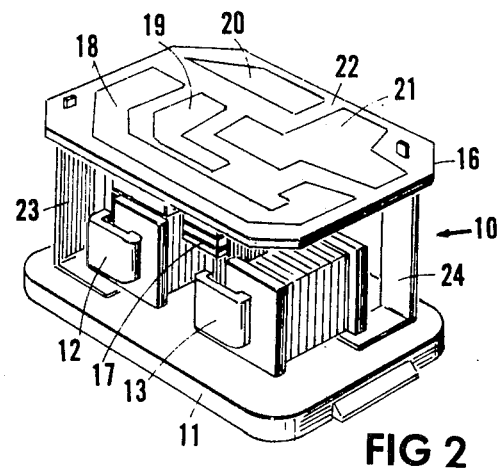
FIG. 2 is a perspective view of the present device showing a rigid manner of construction.

In the drawings the two stage timer control device 10 of the invention comprises a base 11 carrying two relays 12 and 13 each having normally open switch armatures 14,15. The electrical circuitry and other electrical components are supported by rigid insulate plate 16 from which components 17 are suspended and interconnect as required by plated conducting members 18, 19, 20 and 21 on the upper face 22 thereof, said plate being rigidly supported on base 11 by conducting supports 23,24 as seen in FIG. 2. Terminals 25, 26, 27, 28, 29 and 30 project downwardly from base 11 to engage in a suitable socket mount (not shown).

Figure 1:
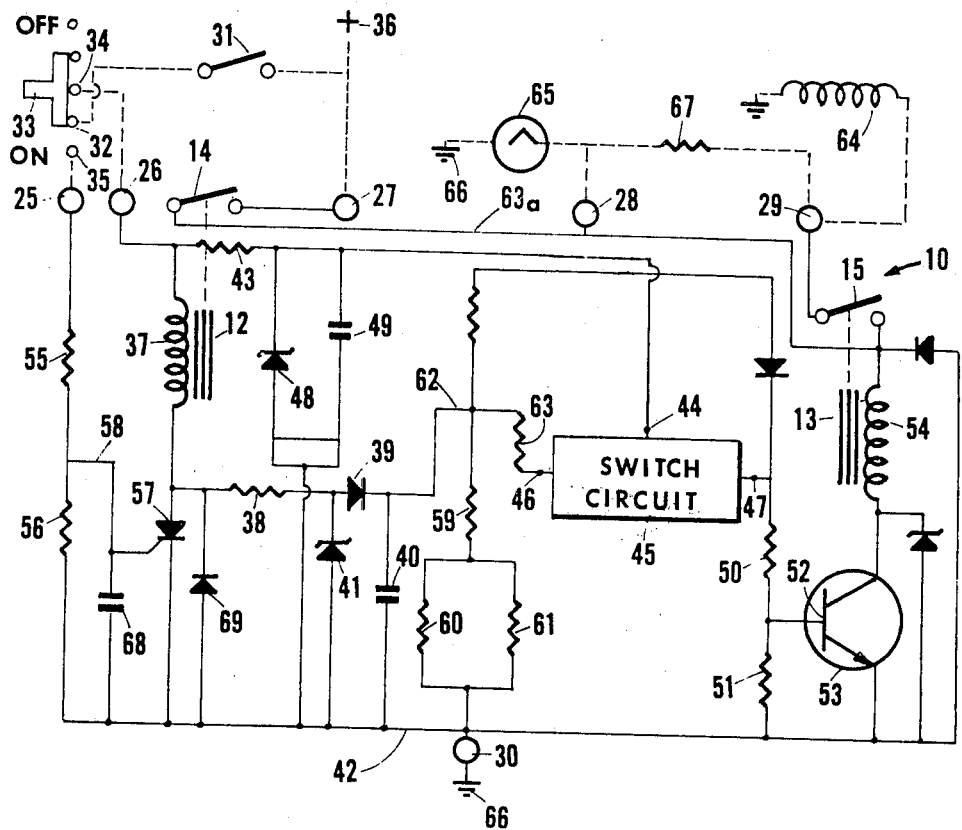
FIG. 1 is an electrical schematic of the device of the invention.

In the schematic of FIG. 1, the terminals of the device 10 comprise actuating switch (timer) terminal 25, ignition switch terminal 26, battery terminal 27, indicator light terminal 28, alternator field coil terminal 29 and chassis ground terminal 30.

Externally of the device 10 and in the automobile circuitry are provided the ignition switch 31 to which contact 32 of ON-OFF actuating switch 33 is connected. Switch contact 34 connects to ignition switch terminal 26 and normally open contact 35 connects to switch (timer) terminal 25.

When ignition switch 31 is closed, current from battery source 36 passes through same and contacts 32,34 of normally open actuating switch 33 to terminal 26 and through coil 37 of first relay 12, resistor 38 and diode 39 to charging condenser 40 at a voltage threshold determined by Zener diode 41 connecting to chassis ground line 42. The current flow through relay coil 37 is insufficient to generate noticeable magnetic flux and therefore first armature switch 14 does not close. Resistor 43 between ignition terminal 26 and input terminal 44 of switch circuit 45 (Schmidtt Trigger type) having control terminal 46 and output terminal 47 provides voltage regulation by Zener diode 48 and condenser 49 connected in parallel between input terminal 44 and ground line 42 to a value of say 8.2 volts.

Trigger switch circuit 45 is activated to connect the input and output terminals 44 and 47 therethrough by a sufficient voltage on control terminal 46 (say 3.5V or more). When power is applied to ignition terminal 26, condenser 40 charges up through relay coil 37, resistor 38 and diode 39 to a voltage set by Zener diode 41 (9.1 volts) minus voltage drop of diode 39 (0.6 volts say) or 8.5 volts. Since the switching voltage available (8.5 volts) is greater than (3.5 volts) required, the trigger switch circuit 45 will connect its input terminal 44 to output terminal 47 connecting through resistors 50 and 51 to ground line 42 to activate base 52 of transistor 53.

Thus, with actuating switch 33 in the neutral position, the operative circuitry of device 10 is set up when the ignition switch 31 is closed whereby condenser 40 is charged and transistor 53 is in the conducting state. Note that relay switch armature 14 remains open under this condition and is adapted to connect rear light relay coil 54 to battery terminal 27 only when closed by moving activating switch 33 to the ON position momentarily to apply battery voltage to terminal 25 connecting through voltage dividing resistors 55,56 to line 42 to bias SCR 57 through line 58 to the conducting state thus connecting relay coil 37 between terminal 26 and ground line 42. The relay 12 will thereupon close and SCR will remain conducting until the ignition switch is turned off or switch 33 is moved to the OFF position from neutral to disconnect contact 34 thereof from ignition contact 32.

When SCR 57 is rendered conducting by actuation of actuating switch 33 to the ON position momentarily, winding 37 of first relay 12 is thereby connected to ground line 42 and charged condenser 40 blocked by diode 39 discharges through resistance timing network 59, 60, 61 to ground line 42 from an initial value of 8.5 volts to 3.5 volts in 10 minutes (for example) and thus line 62 communicating control voltage from condenser 40 through input resistor 63 to control terminal 46 of switch circuit 45 causes the latter to disconnect input terminal 44 from output terminal 47 rendering transistor 53 nonconducting and opening relay 54 when the control voltage at 46 decays to less than 3.5 volts.

First relay 12 remains energized and armature 14 closed whereby terminals 27 and 28 are interconnected through line 63a until SCR 57 is deactivated by turning the ignition off or by moving actuating switch 33 to the OFF position.

The alternator field coil 64 is connected to field coil terminal 29, the latter being connected to second relay armature switch 15. In external wiring, indicator lamp 65 is connected between lamp terminal 28 and chassis ground 66. A resistor 67 is connected between lamp terminal 28 and field winding terminal 29.

In operation the second relay 13 is set up by activation of transistor 53 as the ignition switch 31 is turned on even though manual control switch 33 is in the neutral position. Condensor 40 is charged and switch circuit 45 rendered operative by voltage on control terminal 46. The second relay coil 54 however is not energized because the first relay switch armature 14 remains open until the actuating switch 33 is moved momentarily to the ON position beginning a timing cycle preferably of the order of ten minutes during which first relay armature switch 14 through second relay armature switch 15 shunts the resistor 67 causing the field coil 64 to be energized with full battery voltage from terminal 27 during the 10 minute time period. At the end of the time period, switch circuit 45 disconnects thereby deactivating transistor 53 opening relay armature 15. First relay armature switch 14 is held in by SCR 57 which connects battery voltage through terminals 27,28 and through external resistor 67 to field coil terminal 29 thus substantially reducing the voltage on alternator field coil 64. Excluding the external circuitry to which the control device of the invention is connected in automobile circuitry for a window heater energized by an alternator having a field winding, it will be evident that the device provides: a manual switch terminal, an ignition terminal, a battery terminal, an indicator terminal, a field winding terminal and a ground terminal. By way of summary, it will further be evident that the device of the invention comprises a first normally open relay 12 having a winding 37 and a first normally open armature switch 14. A triggerable switch device such as SCR 57 is electrically in series with the first relay winding 37 between the ignition terminal 26 and ground terminal 30. A trigger circuit 55, 56, 58 and condenser 68 and diode 69 extend electrically between ground 30 and the manual switch terminal 25 to trigger the SCR 57. A timing circuit comprising condenser 40 and resistors 59,60 including temperature compensating resistor 61 is electrically in parallel with the triggerable switch 57 and embodies the operating voltage level determining circuit components 38,41. A second relay 13 having a winding 54 and a second normally open armature switch 15 is rendered operative by a voltage responsive switch 45,53 responsive to a voltage greater than a predetermined value and is connected electrically in series with winding 54 of the second relay 13 between ground 30 and the indicator terminal 28. Said first and second relay switches 14 and 15 are adapted to connect indicator terminal 28, respectively, to battery terminal 27 and field winding terminal 29.

It will be apparent that switch circuit 45 and transistor 53 effectively operate in cascade as a voltage responsive switch for relay coil 54 responsive to voltage on control terminal 46 which voltage is of a predetermined value, i.e., greater than 3.5 volts by way of example. Once the device of the invention has completed its timed cycle, the field winding is on lower voltage connection through resistor 67 from terminal 28 until the operator moves the actuating switch 33 to the OFF position to remove voltage from terminal 26 or the ignition is turned off to accomplish the same end.

I claim:

1. A control device for an automotive window heater energized by an alternator having a field winding and comprising: a manual switch terminal, an ignition terminal, a battery terminal, an indicator terminal, a field winding terminal and a ground terminal; a first normally open relay having a winding and a first normally open armature switch; a triggerable switch device electrically in series with said first relay winding between said ignition terminal and ground; a trigger circuit for said triggerable switch electrically disposed between ground and said manual switch terminal; a timing circuit including a chargeable condenser; a second relay having a winding and a second normally open armature switch; and a voltage responsive switch responsive to a voltage greater than a predetermined value and electrically in series with said winding of said second relay between ground and said indicator terminal; said first and second relay switches when closed connecting said indicator terminal respectively to said battery terminal and said field winding terminal.

2. The device of claim 1 in which the voltage responsive switch comprises a transistor having a base, an emitter and a collector, said emitter and collector being electrically in series with said second relay winding; and means for applying an activating voltage to the base of said transistor responsive to ignition voltage on said ignition terminal.

3. The device of claim 1 in which removal of voltage from said switch terminal deenergizes said first relay and said control device.

* * * * *